Nov. 10, 1964   N. MACE   3,156,063
COMBINED FISH NET AND TACKLE BOX
Filed Nov. 13, 1963
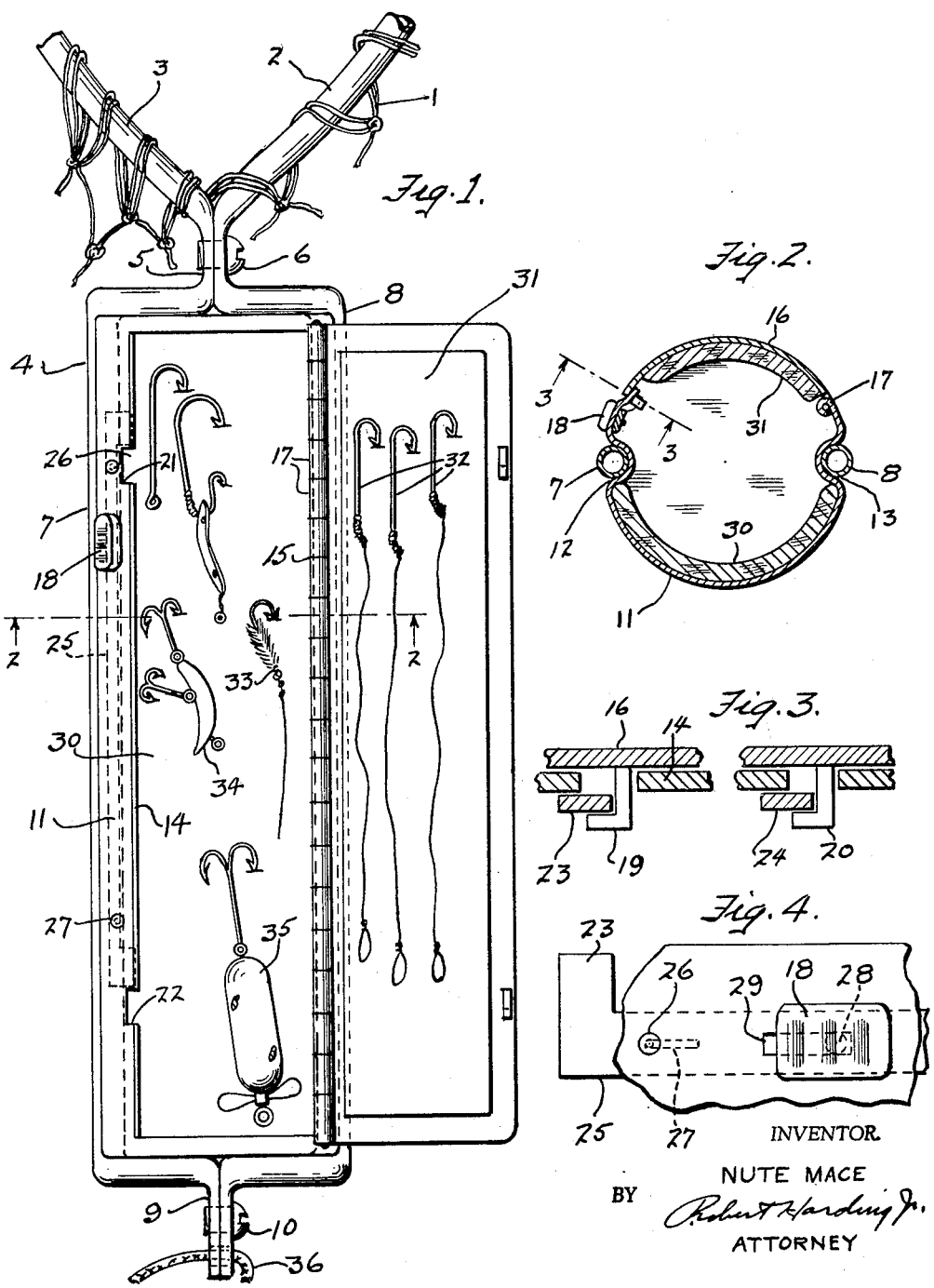
INVENTOR.
NUTE MACE
BY Robert Harding Jr.
ATTORNEY United States Patent Office 3,156,063
Patented Nov. 10, 1964

3,156,063
COMBINED FISH NET AND TACKLE BOX
Nute Mace, 87 Allen St., Sylva, N.C.
Filed Nov. 13, 1963, Ser. No. 323,480
8 Claims. (Cl. 43—11)

This invention relates to fish landing nets and the principal object thereof is to provide a fish landing net with a tackle box in the handle which may be easily opened while holding the net for the removal or insertion of hooks or other tackle. Another object of the invention is to provide a fish landing net with a removable tackle box in the handle, so that the net may be used with or without the tackle box.

Other objects of the invention and objects relating to the construction and arrangement of the various parts will be apparent as the description proceeds.

The invention is illustrated in the accompanying drawings in which:

FIGURE 1 is a plan view of the handle of a fish net illustrating one embodiment of my invention and showing the tackle box with the cover open;

FIGURE 2 is a cross sectional view through the handle of FIGURE 1, taken on the line 2—2 of FIGURE 1, but showing the cover in closed position;

FIGURE 3 is an enlarged sectional view of the cover and side wall of the box, taken on the line 3—3 of FIGURE 2, and showing the latch arrangement; and FIGURE 4 is an enlarged plan view of a portion of the box, showing the latch button and one of the latching tabs.

Referring now more specifically to the drawings, the net 1 is supported in the usual manner on a frame 2 which has a net-supporting loop 3 and a handle portion 4 formed integral with the loop 3.

The frame 2 is preferably made tubular of some strong, light material, such as aluminum. Where the two ends of the loop portion 3 comes together, the frame is flattened, as at 5, for a short distance, and is provided with means, such as the screw 6, for removably securing the two parts rigidly together. The two ends of the frame are then bent away from each other for a short distance, forming one end of the handle portion 4, and then are bent parallel to each other for about seven inches to provide hand-grip members 7 and 8. At the extreme end these members are bent towards each other again, forming the other end of the handle portion 4, and then are flattened, as at 9, and extended in contact with each other a short distance. Means, such as the screw 10, is provided for removably securing the ends together.

Thus constructed, the net may be used in the ordinary way by merely grasping the members 7 and 8 as the handle. But the invention also includes a tackle box 11 which is fitted between the hand grip members 7 and 8 and is secured thereby. This box extends the full length of the members 7 and 8 and is preferably circular in cross section, so that it is complementary to the hand-grip members 7 and 8 to form a fully rounded handle. It may be made of any suitable material, such as aluminum or plastic.

The box 11 is provided with two lengthwise grooves 12 and 13 on opposite sides thereof arranged to receive, respectively, the hand-grip members 7 and 8, so that when the screws 6 and 10 are in place, the box is rigidly held between the members 7 and 8.

The opening for the box is provided on one side of the plane through the hand-grip members 7 and 8, leaving opposing edges 14 and 15 adjacent the grooves 12 and 13. A cover 16, slightly larger than the opening and having the same general curvature as the wall of the box, is provided and is hinged to the edge 15 in any desirable manner, as by means of the piano hinge 17. The opposite edge of the cover 16 is arranged to be latched in closed position against the edge 14 of the box in any desirable manner that permits it to be unlatched by means of a button 18, similar to the switch on a flashlight.

One form of latching arrangement has been illustrated more specifically in FIGURES 3 and 4. The cover 16 is provided with two or more L-shaped hooks 19 and 20 which extend into the box from the edge of the cover with the hook portions thereof extending towards the net-supporting portion 3 of the frame. Cut-away openings 21 and 22 are provided in the edge 14 of the box to permit these members 19 and 20 to pass through when the cover is closed.

These hooks 19 and 20 are engaged by tabs 23 and 24, respectively, which are integral with a strip 25 mounted on the inside wall of the box for limited movement parallel with the edge 14. To this end, the strip 25 is secured to the wall of the box by means of rivets 26 which pass through slots 27 in the strip 25. The button 18 for controlling the latch is secured to the strip 25 by means of a pin 28 which passes through a slot 29 in the wall of the box.

With the cover closed and latched, the strip 25 is in its lowermost position, as shown in FIGURE 1, and in its farthest right position, as shown in FIGURES 3 and 4. In this position, the tabs 23 and 24 engage the hooks 19 and 20 and prevent the cover from opening. To release the latch, the operator has only to push the button 18 towards the net, and the strip 25 will slide the tabs 23 and 24 from the hooks 19 and 20, so that the cover can be raised.

The inside of the box may be arranged in any convenient manner. I prefer to line both the box and the cover with layers of cork, indicated at 30 and 31, which may be fastened in any desired manner, as by cementing in place. Fish hooks 32, flies 33, spinners 34, and minnows 35 may then be hooked into the cork to maintain them in position in the box while the net is in use.

The button 18 is preferably positioned near the net end of the box where it can be easily manipulated by the thumb of the left hand which normally holds the net.

The ends 9 of the frame may be provided with a hole to receive a cord 36 by means of which the net may be slung over the shoulder.

While I have shown a box with a circular cross section, it will be evident that other configurations may be used, as long as such configuration does not interfere with the function of the box as a complementary handle member.

In order to remove the box, the user has only to loosen the screws 6 and 10 and separate the frame members 7 and 8 slightly to permit the box to be slipped out of its position between these two members, whereupon the screws are tightened again. The net may thus be used with or without the box with equal facility.

Many modifications of what has been shown and described may be made without departing from the spirit of the invention. For example, the box may be streamlined to give it a more pointed, tapered end towards the net and a rounded opposite end. I do not therefore wish to limit my invention except by the limitations contained in the following claims.

What I desire to claim and secure by Letters Patent is:

1. A fish net comprising:
   (a) a supporting frame having a net-supporting loop portion and an integral handle portion formed of the extended ends of said loop portion, said ends being extended outwardly away from each other, then parallel to each other, and then towards each other again at the extreme ends to form two spaced parallel hand-grip members providing a handle;

(b) a fish net secured to said loop portion;
(c) means for rigidly securing the ends of said loop portion in close proximity between said loop portion and said handle portion;
(d) means for rigidly securing said extreme ends in close proximity; and
(e) a tackle box secured between said hand-grip members and having a shape and size to complement the handle formed by said hand-grip members.

2. A fish net, as defined in claim 1, in which the means for rigidly securing the extreme ends of the handle portion in close proximity is releasable, so that the tackle box may be removed.

3. A fish net, as defined in claim 2, further comprising:
(a) a cover for the tackle box hinged longitudinally of the hand-grip members and adjacent one of them; and
(b) a latch for said cover mounted on said tackle box adjacent the end towards the net and in position to be operated by the thumb of the user grasping the handle portion.

4. A fish net comprising:
(a) a supporting frame having a net-supporting loop portion and a handle portion formed of the two ends of said loop portion extending away from said loop portion as parallelly spaced, elongated, hand-grip members to form a handle;
(b) a net secured to said loop portion;
(c) means for rigidly securing said parallelly spaced members in said spaced relation;
(d) an elongated tackle-carrying box secured between said spaced members, substantially the entire one side of said box being open;
(e) a cover for the open side of said box, hinged to said box adjacent one of said members; and
(f) a releasable latch for said cover near the loop end of said box, where it may be engaged by the thumb of the user when his hand grips the hand-grip members.

5. A fish net, as defined in claim 4, in which the means for rigidly securing the parallel hand-grip members in spaced relation is releasable to permit the removal of the tackle box.

6. A fish net, as defined in claim 5, in which the tackle-carrying box is provided with means for engaging the hand-grip members so that said box may be held securely between them.

7. A fish net, as defined in claim 5, in which each of two opposing faces of the tackle-carrying box is provided with a longitudinal groove conforming with and adapted to receive one of the elongated hand-grip members, so that said box is held securely between said members.

8. A fish net, as defined in claim 4, in which each of two opposing faces of the tackle box is provided with a longitudinal groove conforming with and adapted to receive one of the elongated hand-grip members, so that said box is held securely between said members.

References Cited by the Examiner
UNITED STATES PATENTS

| | | | |
|---|---|---|---|
| 1,057,820 | 4/13 | Gernsback | 132—83 X |
| 2,486,163 | 2/48 | Jenning et al. | 43—11 |

ABRAHAM G. STONE, *Primary Examiner.*

F. RAY CHAPPELL, *Examiner.*